United States Patent
Sun

(10) Patent No.: US 12,145,880 B2
(45) Date of Patent: Nov. 19, 2024

(54) FLUOROPHOSPHATE OPTICAL GLASS, AND OPTICAL PREFORM, ELEMENT AND INSTRUMENT

(71) Applicant: CDGM GLASS CO., LTD, Sichuan (CN)

(72) Inventor: Wei Sun, Sichuan (CN)

(73) Assignee: CDGM GLASS CO., LTD, Sichuan (CN)

(*) Notice: Subject to any disclaimer, the term of this patent is extended or adjusted under 35 U.S.C. 154(b) by 897 days.

(21) Appl. No.: 17/279,575

(22) PCT Filed: Sep. 28, 2018

(86) PCT No.: PCT/CN2018/108273
§ 371 (c)(1),
(2) Date: Mar. 24, 2021

(87) PCT Pub. No.: WO2020/062008
PCT Pub. Date: Apr. 2, 2020

(65) Prior Publication Data
US 2021/0395135 A1 Dec. 23, 2021

(51) Int. Cl.
*C03C 3/247* (2006.01)
*C03B 11/08* (2006.01)

(52) U.S. Cl.
CPC ............. *C03C 3/247* (2013.01); *C03B 11/08* (2013.01); *C03B 2215/412* (2013.01)

(58) Field of Classification Search
CPC ..................................................... C03C 3/247
See application file for complete search history.

(56) References Cited

FOREIGN PATENT DOCUMENTS

| CN | 101544468 | A |   | 9/2009 |
|----|-----------|---|---|--------|
| CN | 101555099 | A |   | 10/2009 |
| CN | 101665324 | A | * | 3/2010 |
| CN | 101665326 | A |   | 3/2010 |
| CN | 102300823 | A |   | 12/2011 |

* cited by examiner

*Primary Examiner* — Elizabeth A. Bolden
(74) *Attorney, Agent, or Firm* — NKL Law; Allen Xue

(57) ABSTRACT

An optical glass contains the following components in molar percentage of cations: 2-20% of $P^{5+}$, 20-40% of $Al^{3+}$, 0.5-10% of $Ba^{2+}$, 5-25% of $Sr^{2+}$, 15-35% of $Ca^{2+}$, and 1-15% of $Mg^{2+}$, and contains the following components in molar percentage of anions: 83-95% of $F^-$ and 5-17% of $O^{2-}$. The fluorophosphate optical glass has a refractive index (nd) of 1.42-1.45, an Abbe number (vd) of 93-96, a density (ρ) of 3.55 g/cm³ or less, a bubble degree of grade B or above, a thermal expansion coefficient of $160\times10^{-7}$/K or less, a durability of water ($D_w$) of grade 2 or above, and an excellent crystallization resistance performance.

21 Claims, No Drawings

FLUOROPHOSPHATE OPTICAL GLASS, AND OPTICAL PREFORM, ELEMENT AND INSTRUMENT

TECHNICAL FIELD

The present invention belongs to the technical field of optical glass, in particular to a fluorophosphate optical glass, an optical preform, an element and an instrument.

BACKGROUND

A fluorophosphate optical glass is a novel glass material having a low refractive index and a low dispersion. The glass may eliminate a special dispersion of secondary spectrum from an optical system, increase a resolution and improve an imaging quality of the optical system, and also has a low softening characteristic, may be directly made into an aspherical lens by virtue of precise mold forming, and can eliminate color aberration, spherical aberration and chromatic aberration and reduce system volume and weight, etc.

Up to now, the fluorophosphate optical glass has been extensively applied to optical instrument combined lenses with a high precision and a high resolution such as digital camera, HD monitor and astronomical telescope, becoming a novel photoelectric material with a potential market prospect. The specific applications thereof in these fields have a higher requirement for the fluorophosphate optical glass. The fluorophosphate optical glasses having an Abbe number of 80 or higher have been reported in the existing disclosed documents. However, these fluorophosphate optical glasses have a high density, poor chemical stability and crystallization resistance performance, a high thermal expansion coefficient and a low bubble content, thereby easily causing damage in the mould pressing and heating.

SUMMARY

The objective of the present invention is to provide a fluorophosphate optical glass having a refractive index (nd) of 1.42-1.45 and an Abbe number (vd) of 93-96, and an optical preform, element and instrument. With a low density, a low thermal expansion coefficient, a high bubble content, excellent chemical stability and crystallization resistance performance and uneasiness to damage during mould pressing and thermal processing, the fluorophosphate optical glass provided by the present invention can be produced massively in a stable mode.

The present invention is implemented by the following technical solution: For the fluorophosphate optical glass, a cation contains $P^{5+}$, $Al^{3+}$ and alkaline earth metal ions, and an anion contains $F^-$ and $O^{2-}$; a thermal expansion coefficient ($\alpha_{20°\,C.-120°\,C.}$) of the optical glass is $160\times10^{-7}$/K or less; a density ($\rho$) is 3.55 g/cm$^3$ or less; and a durability of water (Dw) is grade 2 or above.

Further, the glass contains the following components in molar percentage of cations: 2-20% of $P^{5+}$, 20-40% of $Al^{3+}$, 0.5-10% of $Ba^{2+}$, 5-25% of $Sr^{2+}$, 15-35% of $Ca^{2+}$, and 1-15% $Mg^{2+}$; and the glass containing the following components in molar percentage of anions: 83-95% of $F^-$ and 5-17% of $O^{2-}$.

A fluorophosphate optical glass, containing the following components in molar percentage of cations: 2-20% of $P^{5+}$, 20-40% of $Al^{3+}$, 0.5-10% of $Ba^{2+}$, 5-25% of $Sr^{2+}$, 15-35% of $Ca^{2+}$, and 1-15% of $Mg^{2+}$; and the glass containing the following components in molar percentage of anions: 83-95% of $F^-$ and 5-17% of $O^{2-}$.

The fluorophosphate optical glass further contains 0-6% of $Ln^{3+}$, 0-10% of $Na^+$, 0-10% of $Li^+$ and 0-10% of $K^+$, wherein $Ln^{3+}$ is one or more of $La^{3+}$, $Gd^{3+}$, $Y^{3+}$ and $Yb^{3+}$.

A fluorophosphate optical glass, which is composed of the following components in molar percentage of cations: 2-20% of $P^{5+}$, 20-40% of $Al^{3+}$, 0.5-10% of $Ba^{2+}$, 5-25% of $Sr^{2+}$, 15-35% of $Ca^{2+}$, 1-15% of $Mg^{2+}$, 0-10% of $Na^+$, 0-10% of $Li^+$, 0-10% of $K^+$, and 0-6% of $Ln^{3+}$, wherein $Ln^{3+}$ is one or more of $La^{3+}$, $Gd^{3+}$, $Y^{3+}$ and $Yb^{3+}$, and the glass is composed of the following components in molar percentage of anions: 83-95% of $F^-$ and 5-17% of $O^{2-}$.

Further, a refractive index (nd) of the glass is 1.42-1.45, preferably 1.43-1.44; an Abbe number (vd) is 93-96, preferably 94-95.5.

Further, wherein the $P^{5+}$ is 3-15%, and/or the $Al^{3+}$ is 25-38%, and/or the $Ba^{2+}$ is 1-8%, and/or the $Sr^{2+}$ is 10-22%, and/or the $Ca^{2+}$ is 20-33%, and/or the $Mg^{2+}$ is 2-12%, and/or the $Ln^{3+}$ is 0-5%, and/or the $Na^+$ is 0-4%, and/or the $Li^+$ is 0.5-5%, and/or the $K^+$ is 0-5%.

Further, wherein the $Ba^{2+}/Ca^{2+}$ is 0.01-0.155, and/or the $Ba^{2+}/(Ca^{2+}+Mg^{2+})$ is 0.08-0.13, and/or the $O^{2-}/F^-$ is 0.105-0.2.

Further, wherein the $P^{5+}$ is 5-10%, and/or the $Al^{3+}$ is 30-35%, and/or the $Ba^{2+}$ is 1-5%, and/or the $Sr^{2+}$ is 15-20%, and/or the $Ca^{2+}$ is 25-30%, and/or the $Mg^{2+}$ is 5-10%, and/or the $Ln^{3+}$ is 0.5-3%, and/or the $Na^+$ is 0.5-2%, and/or the $Li^+$ is 0.5-3%, and/or the $K^+$ is 0-2%.

Further, wherein the $Ba^{2+}/Ca^{2+}$ is 0.05-0.155, and/or the $Ba^{2+}/(Ca^{2+}+Mg^{2+})$ is 0.09-0.125, and/or the $O^{2-}/F^-$ is 0.11-0.18.

Further, wherein the $Ba^{2+}/Ca^{2+}$ is 0.1-0.15, and/or the $Ba^{2+}/(Ca^{2+}+Mg^{2+})$ is 0.1-0.12, and/or the $O^2/F^-$ is 0.11-0.15.

Further, wherein the $Y^{3+}$ is 0-5%, preferably 0-4%, more preferably 0.5-3%; $La^{3+}$ is 0-5%, preferably 0-3%, more preferably 0-1%; $Gd^{3+}$ is 0-5%, preferably 0-3%, more preferably 0-1%; $Yb^{3+}$ is 0-5%, preferably 0-3%, more preferably 0-1%.

Further, an $F^-$ content is 85-92%, more preferably 87-91%; an $O^{2-}$ content is 8-15%, more preferably 9-13%.

Further, a thermal expansion coefficient ($\alpha_{20°\,C.-120°\,C.}$) of the glass is $155\times10^{-7}$/K or less; a density ($\rho$) is 3.53 g/cm$^3$ or less; a bubble content is grade B or above, preferably grade A or above, more preferably grade $A_0$ or above; a durability of water (Dw) is grade 1 or above.

An optical preform prepared from the fluorophosphate optical glass.

An optical element prepared from the fluorophosphate optical glass and the optical preform.

An optical instrument prepared from the optical element.

Compared with the prior art, the present invention has the following beneficial effects:

Through the reasonable component design, the fluorophosphate optical glass provided by the present invention has the excellent chemical stability, crystallization resistance performance, thermal expansion coefficient and bubble content. The fluorophosphate optical glass provided by the present invention has the refractive index (nd) of 1.42-1.45, the Abbe number (vd) of 93-96, and the thermal expansion coefficient ($\alpha_{20°\,C.-120°\,C.}$) of $160\times10^{-7}$/K or less; the density ($\rho$) of 3.55 g/cm$^3$ or less; and the bubble content of grade B or above; and a durability of water (Dw) is grade 2 or above.

DESCRIPTION OF EMBODIMENTS

The present invention will be further described in details in combination with the following embodiments for the purpose of clear understanding of the objective, technical solution and advantages of the present invention. It should be understood that the specific implementations depicted herein are merely used for explaining the present invention, without any limit to the present invention.

The following paragraphs will explain the functions and limited scopes of all components contained in the fluorophosphate optical glass provided by the present invention in connection with the specific principles.

It should be noted that each cation and the total content of cations are expressed by "molar percentage of cations", and each anion and the total content of anions are expressed by "molar percentage of anions" herein. The "molar percentage of cations" refers to the percentage of a certain cation in the total cations, and the "molar percentage of anions" refers to the percentage of a certain anion in the total anions.

It should be noted that an ionic valency of each component is a typical value just for convenience, without difference from other ionic valencies. The ionic valencies of all components present in the optical glass have other possibilities in addition to the typical values. For example, P is present in the glass in the form of an ionic valency of 5, and thus has "$P^{5+}$" as the representative herein, but possibly has other ionic valency states, and meanwhile also falls into the protection scope of the present invention.

$P^{5+}$ is an important component which plays its role as a network structure in the fluorophosphate glass, and constitutes main elements of a glass frame together with $O^{2-}$, which can improve a mechanical property of the glass while keeping a glass forming stability. In the fluorophosphate optical glass provided by the present invention, when a $P^{5+}$ content is lower than 2%, a crystallization tendency of the glass will increase, and a stability will get worse; when the $P^{5+}$ content is higher than 20%, the glass properties will be greatly affected, and optical constants required by the present invention will be obtained difficultly. Hence, in an attempt to consider the stability and optical property of the glass, the $P^{5+}$ content is defined to be 2-20%, preferably 3-15%, more preferably 5-10%.

$Al^{3+}$ is an important component to improve a devitrification resistance and a chemical stability in the fluorophosphate glass; when a content thereof is lower than 20%, the chemical stability of the glass declines, and thus a lower limit is 20%, preferably 25%, more preferably 30%; when the content thereof is higher than 40%, the required refractive index and Abbe number cannot be obtained due to the decreasing contents of other ingredients, and meanwhile, a transformation temperature $T_g$ of the glass will increase greatly, which will cause the rise of a forming temperature, and the increase of opacification tendency, fragility and an abrasion hardness. Hence, an upper limit of an $Al^{3+}$ is 40%, preferably 38%, more preferably 37%, further preferably 36%, and still further preferably 35%.

The main effects of alkaline earth metal ions such as $Ba^{2+}$, $Sr^{2+}$, $Ca^{2+}$ and $Mg^{2+}$ are to improve the chemical stability and crystallization resistance performance of the glass, allow the glass to reach the expected optical property, control the refractive index and the Abbe number, and meanwhile optimize a production process of the optical glass.

To be specific, $Ba^{2+}$ is beneficial for the devitrification resistance and the refractive index of the glass; when the content thereof is lower than 0.5%, the chemical stability and the devitrification resistance of the glass get worse; when the content is higher than 10%, the required refractive index and Abbe number cannot be reached, and meanwhile the specific gravity of the glass will increase. Hence, a $Ba^{2+}$ content is defined to be 0.5-10%, preferably 1-8%, more preferably 1-5%.

$Sr^{2+}$ is effective in improving the devitrification resistance of the glass, and may effectively adjust the refractive index and the specific gravity of the glass. If the content thereof is excessive, the refractive index and the dispersion of the glass will increase, so that the expected chemical property will be reached difficultly, and meanwhile the chemical stability of the glass will decline. Hence, to obtain the better optical property, an $Sr^{2+}$ content is defined to be 5-25%, preferably 10-22%, more preferably 15-20%.

$Ca^{2+}$ may lower the Abbe number and specific gravity of the glass, stabilize the glass forming, and improve the acid and abrasion resistance of the glass. If the content thereof is too low, the required optical property will not be reached; if the content thereof is too high, the devitrification resistance and the chemical stability of the glass will get worse. Hence, a $Ca^{2+}$ content is defined to be 15-35%, preferably 20-33%, more preferably 25-30%.

$Mg^{2+}$, with the effect of improving a thermal stability and an abrasionresistance of the glass, is added to effectively improve the glass formation, the devitrification resistance and a processibility of the glass. If a content thereof is too low, the possibility to adjust the processibility is low, and the glass processing difficulty is increased; if the content thereof is too high, other alkaline earth metal contents decrease, and the required optical property cannot be reached. Hence, a $Mg^{2+}$ content is defined to be 1-15%, preferably 2-12%, more preferably 5-10%.

With respect to the addition types of alkaline earth metals and contents of various ingredients, the inventor, according to the research findings, has found that the refractive index and the Abbe number of the fluorophosphate optical glass provided by the present invention can be obtained when four alkaline earth metals ($Ba^{2+}$, $Sr^{2+}$, $Ca^{2+}$ and $Mg^{2+}$) are added to jointly adjust the glass properties through an synergistic action. Thus, the glass has the good chemical stability (including the durability of water and the durability of acid), the bubble content and the crystallization resistance performance, and meanwhile is uneasily damaged during the mold forming and heating, thereby lowering the difficulty of the production process.

Further, the inventor, through the research findings, has found that the ratios of $Ba^{2+}/Ca^{2+}$ and $Ba^{2+}/(Ca^{2+}+Mg^{2+})$ have a great influence on the density, bubble content, chemical stability and crystallization resistance performance; when the ratio of $Ba^{2+}/Ca^{2+}$ is higher than 0.155, the specific gravity of the glass will increase, and thus the lightweight purpose can be reached difficultly; when the ratio of $Ba^{2+}/Ca^{2+}$ is lower than 0.01, the glass will easily generate bubbles, and the crystallization resistance performance will decline. Hence, to balance the additions of $Ba^{2+}$ and $Ca^{2+}$, reduce the glass density and improve the bubble content and the crystallization resistance performance, $Ba^{2+}/Ca^{2+}$ is defined to be 0.01-0.155, preferably 0.03-0.155, more preferably 0.05-0.155, further preferably 0.1-0.15.

When the ratio of $Ba^{2+}/(Ca^{2+}+Mg^{2+})$ is higher than 0.13, the additions of $Ba^{2+}$, $Ca^{2+}$ and $Mg^{2+}$ are unbalanced, and thus the specific gravity of the glass will increase; when the ratio of $Ba^{2+}/(Ca^{2+}+Mg^{2+})$ is lower than 0.08, the chemical stability of the glass will get worse, and the crystallization resistance performance will decline. Hence, to lower the density and improve the chemical stability and crystallization resistance performance of the glass, $Ba^{2+}/(Ca^{2+}+Mg^{2+})$ is defined to be 0.08-0.13, preferably 0.09-0.125, more preferably 0.1-0.12.

Alkali metals such as $Li^+$, $Na^+$ and $K^+$ can lower the viscosity and transformation temperature of the glass and easily produce the glass ingredients; but if they are introduced excessively, the stability will reduce, the thermal expansion coefficient of the glass will increase and the durability of water will lower. Hence, a $Na^+$ content is defined to be 0-10%, preferably 0-4%, more preferably 0.5-2%; a $Li^+$ content is defined to be 0-10%, preferably 0.5-5%, more preferably 0.5-3%; a $K^+$ content is defined to be 0-10%, preferably 0-5%, more preferably 0-2%, further preferably the content is not introduced. $Ln^{3+}$ ($La^{3+}$, $Gd^{3+}$, $Yb^{3+}$ and $Y^{3+}$), as rare earth elements, are the ingredients to keep the low dispersion and improve the refractive index of the glass. If the contents thereof are too high, the effects cannot be reached. However, the refractive index of the glass will exceed the required scope if they are excessively added; and meanwhile, the chemical stability of the glass will lower if a melting temperature rises. Hence, a total content of the rare earth element $Ln^{3+}$ is defined to be 0-6%, preferably 0-5%, more preferably 0.5-3%. $Y^{3+}$ is 0-5%, preferably 0-4%, more preferably 0.5-3%; $La^{3+}$ is 0-5%, preferably 0-3%, more preferably 0-1%; $Gd^{3+}$ is 0-5%, preferably 0-3%, more preferably 0-1%; and $Yb^{3+}$ is 0-5%, preferably 0-3%, more preferably 0-1%.

Within a range not impairing the glass properties of the present invention, 0-5% of the other cations not mentioned above can be added according to the needs, including $Si^{4+}$, $B^{3+}$, $Ti^{4+}$, $Nb^{5+}$, $W^{6+}$, $Zr^{4+}$, $Zn^{2+}$, $Ge^{4+}$, $Te^{4+}$, $Sb^{3+}$ and $Sn^{4+}$. However, for the transition metal ingredients such as V, Cr, Mn, Fe, Co, Ni, Cu, Ag, and Mo, even if they are contained in a single or compound form, the glass could be colored and absorb a specific wavelength in the visible light region, thereby weakening the property of the present invention in improving the visible light transmittance, and therefore, in particular, for the optical glass with requirement on wavelength transmittance in the visible region, it is preferably not actually included.

Pb, Th, Cd, Tl, Os, Be, and Se cations have been used in a controlled manner as harmful chemical substances in recent years, which is necessary not only in the glass manufacturing process, but also in the processing procedure and disposal after the productization for environmental protection measures. Therefore, in the case of attaching importance to the influence on the environment, they are preferably not actually included except for the inevitable incorporation. As a result, the optical glass does not actually contain substances that contaminate the environment. Therefore, the optical glass provided by the present invention can be manufactured, processed and discarded even if a measure is not taken as a special environmental countermeasure.

Then, the anion ingredients will be described in details.

In the fluorophosphate optical glass provided by the present invention, $O^{2-}$ and $F^-$ are anion ingredients, which are added to realize the required optical property and glass stability.

To be specific, $F^-$ is a critical component which allows the glass to have the low dispersion and abnormal dispersion, and is effective in lowering the refractive index, temperature coefficient and $T_g$; if the content thereof is too low, the required properties will be reached difficultly; and if the content thereof is too high, the chemical stability of the glass will be weakened, the thermal expansion coefficient and abrasion hardness will be increased, especially in a melting process, the volatilization of F will not only pollute the environment, but also the internal composition of the glass will be uneven, which will cause abnormal data, stripe and other defects. Hence, an $F^-$ content is 83-95%, preferably 85-92%, more preferably 87-91%.

$O^{2-}$ is a necessary component that constitutes a network structure of the fluorophosphate optical glass; if a content thereof is too low, the glass stability will be poor and the refractive index required by the present invention will be reached difficultly; if the content thereof is too high, the required dispersion and abnormal dispersion will be obtained difficultly. Hence, an $O^{2-}$ content is defined to be 5-17%, preferably 8-15%, more preferably 9-13%.

The inventor, through research findings, has found that the molar content ratio of $O^{2-}$ to $F^-$ ($O^{2-}/F^-$), has a great influence on the thermal expansion coefficient, the mouldability property and the glass forming property for the fluorophosphate optical glass; when the ratio of $O^{2-}/F^-$ is lower than 0.105, the thermal expansion coefficient is higher and the mouldability property is poor; when the ratio of $O^{2-}/F^-$ is higher than 0.2, the glass forming property is disadvantageous. Hence, to lower the thermal expansion coefficient of the glass, avoid easy damage during the mould pressing and thermal processing and improve the glass forming property, the ratio of $O^{2-}/F^-$ is defined to be 0.105-0.2, preferably 0.11-0.18, more preferably 0.11-0.15.

The anion may contain $Cl^-$, which may be preferably introduced in the form of the cationchloride, preferably in the form of $BaCl_2$, and may be taken as a clarifiant having a content of 0-1% in the present invention.

Hereinafter, the properties of the fluorophosphate optical glass provided by the present invention will be described.

The refractive index (nd) and Abbe number (vd) are tested as per the test method specified in GB/T7962.1-2010.

The thermal expansion coefficient ($\alpha_{20° C.-120° C.}$) is tested as per the test method in GB/T7962.16-2010.

The density ($\rho$) is tested as per the test method specified in GB/T7962.20-2010.

The bubble content is tested as per the test method specified in GB/T7962.8-2010.

The durability of water (Dw) is tested as per the test method specified in GB/T17129.

The test method for the crystallization resistance performance of the glass provided by the present invention comprises the following steps: cutting a sample glass into a specification of 20×20×10 mm, placing into a muffle furnace at a temperature of $T_g+230°$ C. to insulate for preset 30 min, putting into an insulation cotton for annealing after taking out, and visually observing the surface crystallization after cooling, wherein "A" is marked for no obvious crystallization, and "B" is marked for obvious crystallization.

After being tested, the fluorophosphate optical glass provided by the present invention has the following properties that:

the refractive index (nd) of the glass is 1.42-1.45, preferably 1.43-1.44; the Abbe number (vd) is 93-96, preferably 94-95.5; the density ($\rho$) is 3.55 g/cm$^3$ or less, preferably 3.53 g/cm$^3$ or less; a bubble content is grade B or above, preferably grade A or above, more preferably grade $A_0$ or above; the thermal expansion coefficient ($\alpha_{20° C.-120° C.}$) is $160\times10^{-7}$/K or less, preferably $155\times10^{-7}$/K or less;

The melting and forming methods for the production of the optical glass can be carried out by using the technology known to those skilled in the art. The method comprises the steps of weighing and evenly mixing glass raw materials (carbonates, nitrates metaphosphates, fluorides, oxides, etc.) in the proportions of all ions of the glass, then putting into a smelting device (such as platinum crucible), cooling to below 900° C. after appropriate mixing, clarification and homogenization at 900~1,250° C., pouring or leaking to a molding die, and finally conducting post-processing including annealing, processing, etc., or pressing and forming directly through a precise press molding technology.

The fluorophosphate optical glass provided by the present invention may be taken as a glass preform material for pressure molding, or the molten glass may be directly subject to pressure molding. The known manufacturing and molding methods may be used because there is no special restriction on the manufacturing and thermal molding methods when the glass is used as the glass preform.

The present invention also provides an optical element prepared from the optical glass according to the method that is well known by those skilled in the art, for example, the molten and soften optical glass is subject to pressure processing directly, in order to manufacture the optical element. Or the glass preform material prepared from the optical glass provided by the present invention is subject to pressure processing, in order to manufacture the optical element.

The present invention further provides an optical instrument prepared from the manufactured optical element. For example, various lenses such as biconvex lens, biconcave lens, planoconvex lens, planoconcave lens and convexoconcave lens, as well as reflector, prism and diffraction grating may be applied to digital camera, digital video camera, camera cell phone and other devices.

The following paragraphs will depict the compositions and properties of the fluorophosphate optical glass provided by the present invention in combination with the specific implementations, but the present invention is not limited to the following embodiments.

[Optical Glass Embodiment]

The compositions of the fluorophosphate optical glass in Embodiments 1-37 and Contrast Examples 1-3 of the present invention, and the results of the refractive index (nd), Abbe number (vd), density (ρ), bubble content, thermal expansion coefficient, durability of water (Dw) and crystallization resistance performance are shown in Tables 1-4, and the ingredients of all components are expressed by mol %.

TABLE 1

| Component | Embodiments | | | | | | | | | |
|---|---|---|---|---|---|---|---|---|---|---|
| | 1 | 2 | 3 | 4 | 5 | 6 | 7 | 8 | 9 | 10 |
| $P^{5+}$ | 3.22 | 4.52 | 2.78 | 7.69 | 4.68 | 8.55 | 19.62 | 12.35 | 8.35 | 15.77 |
| $Al^{3+}$ | 20.00 | 25.00 | 22.42 | 33.34 | 22.07 | 31.11 | 33.24 | 20.16 | 31.84 | 24.19 |
| $Ba^{2+}$ | 5.03 | 4.03 | 5.23 | 4.15 | 4.29 | 4.35 | 1.28 | 1.46 | 3.68 | 4.23 |
| $Sr^{2+}$ | 12.52 | 13.19 | 15.00 | 15.93 | 20.00 | 5.00 | 6.98 | 10.00 | 19.35 | 5.72 |
| $Ca^{2+}$ | 35.00 | 34.98 | 34.85 | 27.85 | 34.99 | 33.96 | 15.00 | 29.2 | 29.52 | 30.00 |
| $Mg^{2+}$ | 12.49 | 9.13 | 12.47 | 7.25 | 6.85 | 7.98 | 1.00 | 9.66 | 6.82 | 10.86 |
| $Y^{3+}$ | 1.22 | 0.14 | 0.00 | 0.01 | 1.21 | 0.47 | 4.90 | 0.73 | 0.00 | 0.50 |
| $La^{3+}$ | 0.05 | 0.00 | 0.00 | 0.05 | 0.99 | 2.11 | 3.50 | 0.00 | 0.00 | 1.21 |
| $Gd^{3+}$ | 2.71 | 1.85 | 0.00 | 0.09 | 0.51 | 0.56 | 0.22 | 0.22 | 0.00 | 1.22 |
| $Yb^{3+}$ | 0.11 | 0.06 | 0.00 | 0.03 | 0.41 | 0.11 | 0.00 | 0.33 | 0.00 | 0.22 |
| $Na^+$ | 0.00 | 6.71 | 0.94 | 0.34 | 4.00 | 0.58 | 3.98 | 2.29 | 0.00 | 3.52 |
| $Li^+$ | 5.96 | 0.30 | 6.14 | 2.25 | 0.00 | 5.00 | 10.00 | 9.13 | 0.44 | 2.21 |
| $K^+$ | 1.69 | 0.09 | 0.17 | 1.02 | 0.00 | 0.22 | 0.28 | 4.47 | 0.00 | 0.35 |
| $Ba^{2+}/Ca^{2+}$ | 0.14 | 0.12 | 0.15 | 0.15 | 0.12 | 0.13 | 0.09 | 0.05 | 0.12 | 0.14 |
| $Ba^{2+}/(Ca^{2+} + Mg^{2+})$ | 0.11 | 0.09 | 0.11 | 0.12 | 0.10 | 0.10 | 0.08 | 0.04 | 0.10 | 0.10 |
| $O^{2-}$ | 9.51 | 14.29 | 15 | 11.58 | 13.39 | 11.00 | 13.00 | 16.23 | 12.24 | 12.15 |
| $F^-$ | 90.49 | 85.71 | 85 | 88.42 | 86.61 | 89.00 | 87.00 | 83.77 | 87.76 | 87.85 |
| $O^{2-}/F^-$ | 0.11 | 0.17 | 0.18 | 0.13 | 0.15 | 0.12 | 0.15 | 0.19 | 0.14 | 0.14 |
| nd | 1.43418 | 1.43284 | 1.42581 | 1.43047 | 1.43369 | 1.43247 | 1.44489 | 1.43169 | 1.42054 | 1.43397 |
| vd | 94.14 | 94.06 | 93.69 | 94.01 | 93.54 | 94.69 | 94.41 | 93.86 | 94.11 | 94.32 |
| Thermal expansion coefficient ($\alpha_{20°\,C.-120°\,C.}$) | 160 | 158 | 157 | 148 | 156 | 148 | 147 | 158 | 148 | 150 |
| Density (ρ) | 3.52 | 3.53 | 3.52 | 3.51 | 3.52 | 3.51 | 3.54 | 3.55 | 3.51 | 3.53 |
| Bubble content | $A_0$ | $A_0$ | A | $A_0$ | $A_0$ | $A_0$ | A | A | $A_0$ | $A_0$ |
| Durability of water ($D_w$) | Grade1 | Grade 2 | Grade 1 | Grade 1 | Grade 1 | Grade 1 | Grade 2 | Grade 2 | Grade 1 | Grade 1 |
| Crystallization resistance performance | A | A | A | A | A | A | A | A | A | A |

TABLE 2

| Component | Embodiments | | | | | | | | | |
|---|---|---|---|---|---|---|---|---|---|---|
| | 11 | 12 | 13 | 14 | 15 | 16 | 17 | 18 | 19 | 20 |
| $P^{5+}$ | 15.00 | 20.00 | 19.33 | 7.36 | 2.00 | 3.95 | 10.00 | 5.86 | 2.03 | 15.00 |
| $Al^{3+}$ | 38.98 | 20.75 | 21.33 | 32.59 | 20.82 | 40.00 | 39.11 | 34.2 | 29.05 | 38.98 |
| $Ba^{2+}$ | 1.94 | 5.21 | 2.95 | 3.50 | 5.00 | 1.93 | 1.98 | 4.30 | 5.05 | 1.94 |
| $Sr^{2+}$ | 7.19 | 5.00 | 5.99 | 16.37 | 7.46 | 12.68 | 24.69 | 15.77 | 11.24 | 7.19 |
| $Ca^{2+}$ | 16.09 | 34.95 | 19.04 | 28.36 | 34.99 | 17.46 | 15.04 | 28.83 | 33.19 | 16.09 |
| $Mg^{2+}$ | 8.16 | 5.12 | 13.12 | 6.12 | 10.00 | 3.98 | 4.76 | 8.15 | 7.69 | 8.16 |
| $Y^{3+}$ | 3.11 | 2.14 | 0.19 | 1.01 | 0.65 | 0.11 | 1.98 | 0.22 | 1.48 | 3.11 |
| $La^{3+}$ | 3.11 | 0.20 | 0.05 | 0.05 | 5.11 | 0.11 | 0.05 | 0.25 | 1.16 | 3.11 |
| $Gd^{3+}$ | 1.12 | 3.2 | 0.08 | 1.02 | 2.11 | 4.56 | 0.05 | 0.17 | 0.22 | 1.12 |
| $Yb^{3+}$ | 0.01 | 0.00 | 0.50 | 0.01 | 0.22 | 4.23 | 0.00 | 0.05 | 0.32 | 0.01 |
| $Na^+$ | 1.26 | 1.01 | 8.33 | 1.20 | 6.09 | 1.96 | 0.50 | 0.70 | 2.98 | 1.26 |

TABLE 2-continued

| | Embodiments | | | | | | | | | |
|---|---|---|---|---|---|---|---|---|---|---|
| Component | 11 | 12 | 13 | 14 | 15 | 16 | 17 | 18 | 19 | 20 |
| $Li^+$ | 3.27 | 1.82 | 8.89 | 2.07 | 4.99 | 8.04 | 0.76 | 1.34 | 5.29 | 3.27 |
| $K^+$ | 0.76 | 0.60 | 0.20 | 0.34 | 0.56 | 0.99 | 1.08 | 0.16 | 0.30 | 0.76 |
| $Ba^{2+}/Ca^{2+}$ | 0.12 | 0.15 | 0.15 | 0.12 | 0.14 | 0.11 | 0.13 | 0.15 | 0.15 | 0.12 |
| $Ba^{2+}/(Ca^{2+} + Mg^{2+})$ | 0.08 | 0.13 | 0.09 | 0.10 | 0.11 | 0.09 | 0.1 | 0.12 | 0.12 | 0.08 |
| $O^{2-}$ | 16.27 | 9.90 | 15.22 | 11.24 | 12.95 | 11.31 | 11.29 | 11.60 | 15.10 | 16.27 |
| $F^-$ | 83.73 | 90.10 | 84.78 | 88.76 | 87.05 | 88.69 | 88.71 | 88.40 | 84.90 | 83.73 |
| $O^{2-}/F^-$ | 0.19 | 0.11 | 0.18 | 0.13 | 0.15 | 0.13 | 0.13 | 0.13 | 0.18 | 0.19 |
| nd | 1.43759 | 1.43586 | 1.42052 | 1.43235 | 1.44295 | 1.44521 | 1.43279 | 1.42059 | 1.43367 | 1.43759 |
| vd | 94.59 | 94.76 | 94.29 | 94.05 | 94.53 | 93.56 | 93.19 | 94.03 | 94.09 | 94.59 |
| Thermal expansion coefficient ($\alpha_{20°C.-120°C.}$) | 157 | 149 | 158 | 149 | 147 | 149 | 150 | 148 | 157 | 157 |
| Density ($\rho$) | 3.55 | 3.54 | 3.55 | 3.51 | 3.52 | 3.53 | 3.51 | 3.51 | 3.55 | 3.55 |
| Bubble content | $A_0$ | $A_0$ | A | $A_0$ | $A_0$ | $A_0$ | $A_0$ | $A_0$ | A | $A_0$ |
| Durability of water ($D_w$) | Grade 2 | Grade 1 | Grade 1 | Grade 1 | Grade 1 | Grade 1 | Grade 1 | Grade 1 | Grade 2 | Grade 2 |
| Crystallization resistance performance | A | A | A | A | A | A | A | A | A | A |

TABLE 3

| | Embodiments | | | | | | | | | |
|---|---|---|---|---|---|---|---|---|---|---|
| Component | 21 | 22 | 23 | 24 | 25 | 26 | 27 | 28 | 29 | 30 |
| $P^{5+}$ | 3.68 | 4.53 | 6.58 | 5.00 | 11.52 | 10.95 | 8.14 | 12.26 | 17.94 | 8.65 |
| $Al^{3+}$ | 26.75 | 20.03 | 32.44 | 29.86 | 35.00 | 21.16 | 33.62 | 23.00 | 24.59 | 30.00 |
| $Ba^{2+}$ | 5.19 | 5.25 | 3.57 | 2.76 | 2.75 | 4.49 | 3.88 | 3.99 | 3.18 | 2.99 |
| $Sr^{2+}$ | 6.01 | 16.28 | 18.59 | 22.00 | 13.08 | 5.98 | 17.30 | 11.03 | 8.29 | 7.94 |
| $Ca^{2+}$ | 35.00 | 34.81 | 28.57 | 19.34 | 18.04 | 30.94 | 26.58 | 33.00 | 25.00 | 19.97 |
| $Mg^{2+}$ | 13.21 | 7.19 | 6.58 | 7.14 | 14.75 | 13.07 | 5.82 | 7.15 | 8.94 | 4.94 |
| $Y^{3+}$ | 5.26 | 1.48 | 0.47 | 1.01 | 0.44 | 0.75 | 1.14 | 1.75 | 1.91 | 5.75 |
| $La^{3+}$ | 0.11 | 2.55 | 0.11 | 1.22 | 0.00 | 3.01 | 0.05 | 0.05 | 1.02 | 3.01 |
| $Gd^{3+}$ | 0.22 | 1.32 | 0.15 | 1.11 | 0.21 | 0.00 | 0.05 | 0.05 | 1.02 | 1.01 |
| $Yb^{3+}$ | 0.11 | 0.01 | 0.12 | 0.11 | 0.22 | 0.01 | 0.04 | 0.05 | 1.05 | 0.01 |
| $Na^+$ | 3.77 | 5.93 | 0.58 | 5.43 | 0.00 | 6.04 | 0.67 | 0.86 | 2.00 | 9.22 |
| $Li^+$ | 0.13 | 0.50 | 1.62 | 4.99 | 3.90 | 3.58 | 1.85 | 5.96 | 5.02 | 5.76 |
| $K^+$ | 0.56 | 0.12 | 0.62 | 0.03 | 0.09 | 0.02 | 0.86 | 0.85 | 0.04 | 0.75 |
| $Ba^{2+}/Ca^{2+}$ | 0.15 | 0.15 | 0.13 | 0.14 | 0.15 | 0.15 | 0.15 | 0.12 | 0.13 | 0.15 |
| $Ba^{2+}/(Ca^{2+} + Mg^{2+})$ | 0.11 | 0.13 | 0.10 | 0.10 | 0.08 | 0.10 | 0.12 | 0.10 | 0.09 | 0.12 |
| $O^{2-}$ | 16.22 | 14.23 | 10.68 | 12.18 | 9.51 | 10.69 | 10.78 | 13.99 | 13.05 | 16.05 |
| $F^-$ | 83.78 | 85.77 | 89.32 | 87.82 | 90.49 | 89.31 | 89.22 | 86.01 | 86.95 | 83.95 |
| $O^{2-}/F^-$ | 0.19 | 0.17 | 0.12 | 0.14 | 0.11 | 0.12 | 0.12 | 0.16 | 0.15 | 0.19 |
| nd | 1.43565 | 1.43696 | 1.43047 | 1.43661 | 1.43105 | 1.43369 | 1.43147 | 1.43248 | 1.43829 | 1.44547 |
| vd | 94.77 | 93.93 | 94.02 | 93.15 | 94.29 | 95.13 | 94.08 | 94.14 | 95.19 | 95.22 |
| Thermal expansion coefficient ($\alpha_{20°C.-120°C.}$) | 160 | 152 | 149 | 148 | 156 | 149 | 148 | 153 | 154 | 157 |
| Density ($\rho$) | 3.52 | 3.55 | 3.51 | 3.52 | 3.55 | 3.53 | 3.51 | 3.53 | 3.53 | 3.51 |
| Bubble content | $A_0$ | A | $A_0$ | $A_0$ | A | $A_0$ | $A_0$ | $A_0$ | $A_0$ | $A_0$ |
| Durability of water ($D_w$) | Grade 1 | Grade 2 | Grade 1 | Grade 1 | Grade 2 | Grade 1 | Grade 1 | Grade 1 | Grade 1 | Grade 1 |
| Crystallization resistance performance | A | A | A | A | A | A | A | A | A | A |

TABLE 4

| | Embodiments | | | | | | | Contrast Examples | | |
|---|---|---|---|---|---|---|---|---|---|---|
| Component | 31 | 32 | 33 | 34 | 35 | 36 | 37 | 1 | 2 | 3 |
| $P^{5+}$ | 3.00 | 3.96 | 6.80 | 11.03 | 16.67 | 9.72 | 10.34 | 17.00 | 19.94 | 2.00 |
| $Al^{3+}$ | 26.75 | 20.11 | 32.64 | 22.07 | 38.00 | 21.13 | 24.31 | 20.75 | 24.59 | 20.82 |
| $Ba^{2+}$ | 2.17 | 5.00 | 4.35 | 4.13 | 1.76 | 4.09 | 3.01 | 8.21 | 1.18 | 5.00 |
| $Sr^{2+}$ | 25.00 | 7.91 | 15.29 | 7.23 | 8.91 | 6.78 | 17.04 | 5.00 | 8.29 | 7.46 |
| $Ca^{2+}$ | 18.24 | 35.00 | 29.85 | 32.17 | 16.28 | 31.27 | 30.10 | 34.95 | 25.00 | 34.99 |

TABLE 4-continued

| Component | Embodiments | | | | | | | Contrast Examples | | |
|---|---|---|---|---|---|---|---|---|---|---|
| | 31 | 32 | 33 | 34 | 35 | 36 | 37 | 1 | 2 | 3 |
| $Mg^{2+}$ | 8.12 | 15.00 | 7.12 | 12.19 | 2.00 | 12.00 | 4.21 | 5.12 | 8.94 | 10.00 |
| $Y^{3+}$ | 1.39 | 0.00 | 0.70 | 2.19 | 2.82 | 1.36 | 0.98 | 2.14 | 1.91 | 0.65 |
| $La^{3+}$ | 1.21 | 0.22 | 0.05 | 2.22 | 1.22 | 4.32 | 0.88 | 0.20 | 1.02 | 5.11 |
| $Gd^{3+}$ | 0.06 | 1.21 | 0.05 | 0.50 | 2.12 | 0.77 | 0.77 | 3.20 | 1.02 | 2.11 |
| $Yb^{3+}$ | 0.52 | 0.11 | 0.05 | 0.25 | 0.06 | 0.77 | 0.22 | 0.00 | 1.05 | 0.22 |
| $Na^+$ | 7.49 | 5.29 | 0.82 | 0.00 | 6.49 | 7.64 | 0.00 | 1.01 | 2.00 | 6.09 |
| $Li^+$ | 0.84 | 4.5 | 1.43 | 5.99 | 3.07 | 0.00 | 8.01 | 1.82 | 5.02 | 4.99 |
| $K^+$ | 5.21 | 1.69 | 0.85 | 0.03 | 0.60 | 0.15 | 0.13 | 0.60 | 0.04 | 0.56 |
| $Ba^{2+}/Ca^{2+}$ | 0.12 | 0.14 | 0.15 | 0.13 | 0.11 | 0.13 | 0.10 | 0.23 | 0.13 | 0.14 |
| $Ba^{2+}/(Ca^{2+} + Mg^{2+})$ | 0.08 | 0.13 | 0.12 | 0.09 | 0.10 | 0.09 | 0.08 | 0.13 | 0.03 | 0.11 |
| $O^{2-}$ | 15.26 | 14.11 | 12.15 | 12.98 | 16.66 | 13.03 | 10.81 | 9.90 | 13.05 | 20.95 |
| $F^-$ | 84.74 | 85.89 | 87.85 | 87.02 | 83.34 | 86.97 | 89.19 | 90.10 | 86.95 | 79.05 |
| $O^{2-}/F^-$ | 0.18 | 0.16 | 0.14 | 0.15 | 0.20 | 0.15 | 0.12 | 0.11 | 0.15 | 0.27 |
| nd | 1.43769 | 1.43252 | 1.43147 | 1.43769 | 1.43891 | 1.43987 | 1.43249 | 1.43569 | 1.43445 | 1.44721 |
| vd | 93.13 | 94.87 | 94.02 | 95.01 | 95.69 | 95.12 | 94.49 | 94.01 | 93.99 | 94.22 |
| Thermal expansion coefficient ($\alpha_{20° C.-120° C.}$) | 158 | 152 | 147 | 147 | 156 | 147 | 148 | 160 | 162 | 165 |
| Density ($\rho$) | 3.55 | 3.55 | 3.51 | 3.54 | 3.54 | 3.55 | 3.55 | 3.59 | 3.56 | 3.55 |
| Bubble content | $A_0$ | $A_0$ | $A_0$ | $A_0$ | $A_0$ | $A_0$ | $A_0$ | C | B | B |
| Durability of water ($D_w$) | Grade 2 | Grade 2 | Grade 1 | Grade 1 | Grade 1 | Grade 1 | Grade 2 | Grade 3 | Grade 3 | Grade 2 |
| Crystallization resistance performance | A | A | A | A | A | A | A | B | B | B |

[Optical Preform Embodiment]

The optical glass obtained in Embodiments 1-37 is cut into a predetermined size, and a release agent is uniformly coated on the surface; then, a mold is heated and softened to be press-molded to produce a preform for various lenses and prisms, such as concave meniscus lens, convex meniscus lens, biconvex lens, biconcave lens, planoconvex lens and planoconcavelens. Or, the optical glass obtained in Embodiments 1-37 is used for forming a pre-molded product for precise press molding, and then precisely press-molded into lens and prism shapes through the precise press molding and processing to produce the preform.

[Optical Element Embodiment]

These preforms obtained in the optical preform embodiment are annealed for fine adjustment while the distortion inside the glass is reduced, so that the optical characteristics such as the refractive index are brought to the desired values.

Then, each preform is ground and polished to form a variety of lenses and prisms such as concave meniscus lens, convex meniscus lens, biconvex lens, biconcave lens, planoconvex lens and planoconcave lens. An anti-reflection film may be coated on the surface of the obtained optical element.

[Optical Instrument Embodiment]

An optical part or an optical component is formed by the optical elements obtained in the optical element embodiment through an optical design, or through one or more optical elements. The optical part or the optical component may be used for imaging device, sensor, microscope, medical technology, digital projection, communication, optical communication technology/information transmission, optics/illumination in an automobile field, photolithography, excimer laser, wafer, computer chip and integrated circuit and electronic devices including such circuits and chips.

All above are only preferred embodiments of the present invention, which do not limit the scope of the present invention. All alterations, equivalent replacements and improvements, without departing from the spirit and principle of the present invention, shall fall into the protection scope of the present invention.

The invention claimed is:

1. A fluorophosphate optical glass, comprising:
in molar percentage of cations, 2-20% of $P^{5+}$, 20-40% of $Al^{3+}$, 0.5-10% of $Ba^{2+}$, 15-35% of $Ca^{2+}$, and 1-15% of $Mg^{2+}$, and an anion contains $F^-$ and $O^{2-}$;
wherein $Ba^{2+}/(Ca^{2+}+Mg^{2+})$ is 0.09-0.125, and
wherein the fluorophosphate optical glass has a thermal expansion coefficient ($\alpha_{20° C.-120° C.}$) of the optical glass is $160\times10^{-7}$/K or less, a density ($\rho$) of 3.55 g/cm³ or less, and a durability in water (Dw) of grade 2 or above.

2. The fluorophosphate optical glass according to claim 1, further comprising: 5-25% of $Sr^{2+}$, wherein, in molar percentage of anions, 83-95% of $F^-$ and 5-17% of $O^{2-}$.

3. The fluorophosphate optical glass according to claim 1, wherein $F^-$ content is 85-92%, and $O^{2-}$ content is 8-15%.

4. The fluorophosphate optical glass according to claim 1, wherein $F^-$ is 87-91%, and $O^{2-}$ is 9-13%.

5. The fluorophosphate optical glass according to claim 1, further comprising 0-6% of $Ln^{3+}$, 0-10% of $Na^+$, 0-10% of $Li^+$, and 0-10% of $K^+$, wherein $Ln^{3+}$ is one or more cations selected from $La^{3+}$, $Gd^{3+}$, $Y^{3+}$ and $Yb^{3+}$.

6. The fluorophosphate optical glass according to claim 5, wherein $Y^{3+}$ is 0-5%, $La^{3+}$ is 0-5%, $Gd^{3+}$ is 0-5%, and $Yb^{3+}$ is 0-5%.

7. The fluorophosphate optical glass according to claim 5, wherein $Y^{3+}$ is 0.5-3%, $La^{3+}$ is 0-1%, $Gd^{3+}$ is 0-1%, and $Yb^{3+}$ is 0-1%.

8. The fluorophosphate optical glass according to claim 1, comprising: 3-15% of $P^{5+}$, and/or 25-38% of $Al^{3+}$, and/or 1-8% of $Ba^{2+}$, and/or 10-22% of $Sr^{2+}$, and/or 20-33% of $Ca^{2+}$, and/or 2-12% of $Mg^{2+}$, and/or O— 5% of $Ln^{3+}$, wherein $Ln^{3+}$ is selected from $La^{3+}$, $Gd^{3+}$, $Y^{3+}$ and $Yb^{3+}$, and/or 0-4% of $Na^+$, and/or 0.5-5% of $Li^+$, and/or 0-5% of $K^+$.

9. The fluorophosphate optical glass according to claim 8, wherein the $P^{5+}$ is 5-10%, and/or the $Al^{3+}$ is 30-35%, and/or the $Ba^{2+}$ is 1-5%, and/or the $Sr^{2+}$ is 15-20%, and/or the $Ca^{2+}$ is 25-30%, and/or the $Mg^{2+}$ is 5-10%, and/or the $Ln^{3+}$ is 0.5-3%, and/or the $Na^+$ is 0.5-2%, and/or the $Li^+$ is 0.5-3%, and/or the $K^+$ is 0-2%.

10. The fluorophosphate optical glass according to claim 1, wherein $Ba^{2+}/Ca^{2+}$ is 0.01-0.155, and/or $O^{2-}/F^-$ is 0.105-0.2.

11. The fluorophosphate optical glass according to claim 1, wherein $Ba^{2+}/Ca^{2+}$ is 0.05-0.155, and/or $O^{2-}/F^-$ is 0.11-0.18.

12. The fluorophosphate optical glass according to claim 1, wherein $Ba^{2+}/Ca^{2+}$ is 0.1-0.15, and/or $Ba^{2+}/(Ca^{2+}+Mg^{2+})$ is 0.1-0.12, and $O^{2-}/F^-$ is 0.11-0.15.

13. The fluorophosphate optical glass according to claim 1, having a refractive index (nd) of 1.42-1.45, and an Abbe number (vd) of 93-96.

14. The fluorophosphate optical glass according to claim 13, having a refractive index (nd) of 1.43-1.44, and an Abbe number (vd) of 94-95.5.

15. The fluorophosphate optical glass according to claim 1, wherein the thermal expansion coefficient ($\alpha_{20°\,C.-120°\,C.}$) is $155\times10^{-7}$/K or less, the density ($\rho$) is 3.53 g/cm³ or less, a bubble content is grade B or above, and the durability in water (Dw) is grade 1 or above.

16. The fluorophosphate optical glass according to claim 15, wherein the bubble content is grade $A_0$ or above.

17. An optical preform prepared from the fluorophosphate optical glass according to claim 1.

18. An optical element prepared from the fluorophosphate optical glass according to claim 1.

19. An optical instrument, comprising the optical element according to claim 18.

20. A fluorophosphate optical glass, comprising: in molar percentage of cations, 2-20% of $P^{5+}$, 20-40% of $Al^{3+}$, 0.5-10% of $Ba^{2+}$, 5-25% of $Sr^{2+}$, 15-35% of $Ca^{2+}$, and 1-15% of $Mg^{2+}$; and in molar percentage of anions, 83-95% of F— and 5-17% of $O^{2-}$, wherein $Ba^{2+}/(Ca^{2+}+Mg^{2+})$ is 0.09-0.125.

21. A fluorophosphate optical glass consisting of the following components in molar percentage of cations: 2-20% of $P^{5+}$, 20-40% of $Al^{3+}$, 0.5-10% of $Ba^{2+}$, 5-25% of $Sr^{2+}$, 15-35% of $Ca^{2+}$, 1-15% of $Mg^{2+}$, 0-10% of $Na^+$, 0-10% of $Li^+$, 0-10% of $K^+$, and 0-6% of $Ln^{3+}$, wherein $Ln^{3+}$ is selected from $La^{3+}$, $Gd^{3+}$, $Y^{3+}$ and $Yb^{3+}$; and the following components in molar percentage of anions: 83-95% of $F^-$ and 5-17% of $O^{2-}$, wherein $Ba^{2+}/(Ca^{2+}+Mg^{2+})$ is 0.09-0.125.

\* \* \* \* \*